July 19, 1960 — J. F. ZISKAL — 2,945,395
ADJUSTABLE STEERING MECHANISM
Filed Jan. 19, 1959 — 4 Sheets-Sheet 1

Inventor:
Joseph F. Ziskal
Atty.

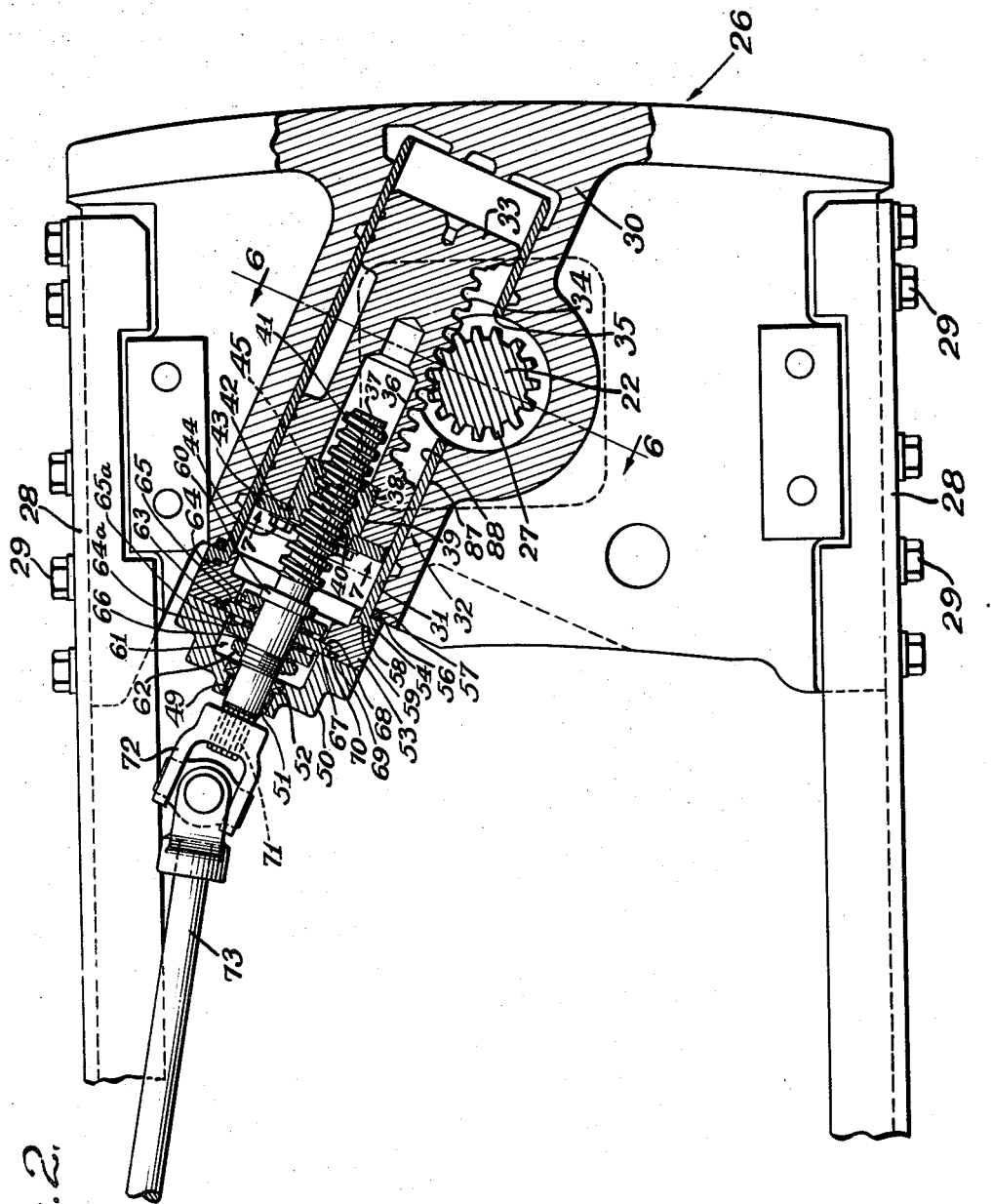

July 19, 1960    J. F. ZISKAL    2,945,395
ADJUSTABLE STEERING MECHANISM
Filed Jan. 19, 1959    4 Sheets-Sheet 3
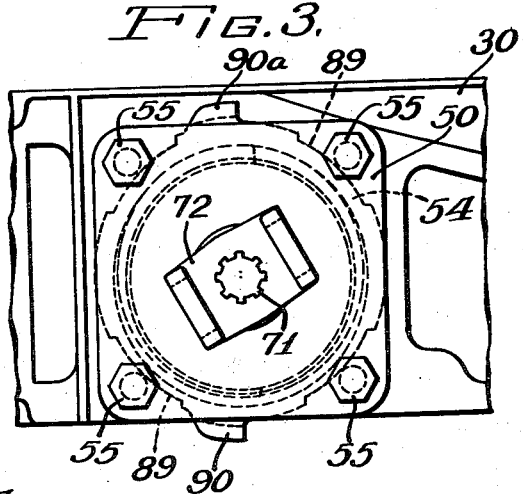
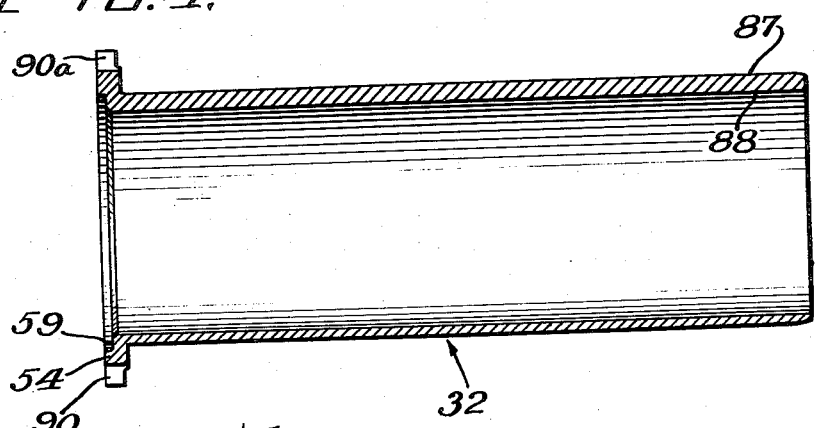
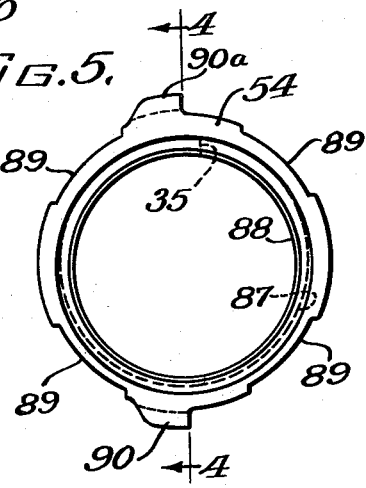
Inventor:
Joseph F. Ziskal July 19, 1960  J. F. ZISKAL  2,945,395
ADJUSTABLE STEERING MECHANISM
Filed Jan. 19, 1959  4 Sheets-Sheet 4
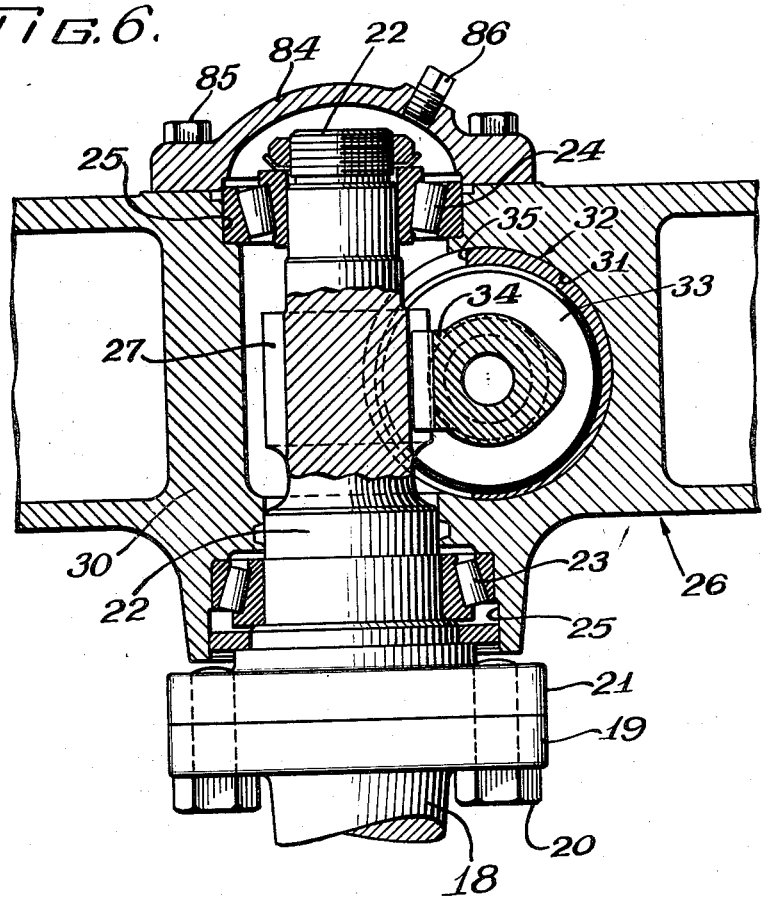
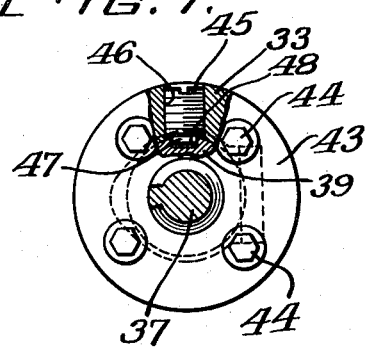
Inventor:
Joseph F. Ziskal
Paul O. Pippel
Atty.

United States Patent Office 2,945,395
Patented July 19, 1960

2,945,395

ADJUSTABLE STEERING MECHANISM

Joseph F. Ziskal, Sprotborough, Doncaster, England, assignor to International Harvester Company, Chicago, Ill., a corporation of New Jersey Filed Jan. 19, 1959, Ser. No. 787,435

9 Claims. (Cl. 74—499)

This invention relates to vehicle steering mechanisms and is particularly concerned with means for compensating for wear or correcting for dimensional inaccuracies between the drive-transmitting portions of such mechanisms.

In certain types of vehicles, particularly tractors utilized for farming operations, it is common practise to provide the vehicle with what is generally termed tricycle steering, i.e., a steering arrangement wherein a single or two closely spaced steerable wheels centrally positioned at the front end of the vehicle are mounted on the lower end of a vertically extending shaft or rotatable column that, in turn, is connected for control purposes through suitable motion-transmitting mechanism to an operator's steering wheel. Usually in this type steering mechanism the rotative motion given to the control wheel by the operator is transmitted by way of a shaft, rod, or flexible linkage to a drive-transmitting means such as a worm or rack and pinion gear device which, in turn, transmits such motion to the upper end of the vertical shaft that carries the steerable front wheels and thereby effects the turning movement desired. Because of the extensive use to which such drive means, and particularly the worm or rack and pinion gear device, is subjected, by virtue of almost constant movement from one direction to another, the wear on the engaging portions of these elements becomes appreciable and must be compensated for in order to continue providing accurate steering control for the vehicle. Sometimes, too, manufacturing tolerances for dimensions are not as well maintained as they should be and the resultant inaccuracies in dimensions of the various elements, particularly the mesh fit of gears, in the mechanisms are such as to require some compensation or correction in the assembled mechanism in order to provide the precise steering control desired.

In the past a great variety of means and methods have been proposed for effecting the adjustment desired between the gear elements of such mechanism in order to compensate for improper gear meshing, resulting either from wear or inaccurate dimensional factors, and thus be able to maintain accurate control of the steering in the associated vehicles. Unfortunately, however, as is generally understood, most of the devices and methods as have heretofore been proposed have not, for one reason or another, been entirely satisfactory. Some of these prior arrangements were cumbersome or expensive to fabricate, while others were not readily adaptable to use with power as well as manual steering mechanisms, and many, of course, failed to provide for improvement of the mesh fit of the gears when such misalignment was the result of manufacturing inaccuracies.

It is a primary feature of the present invention, therefore, to provide a simple, improved, easily actuated and effective adjustable means for improving the driving relationship between engaging drive elements in a vehicle steering mechanism.

An important object is to provide in a manually or power operated steering mechanism a wear compensator means applicable to the rack and pinion drive-transmitting gears thereof.

A more specific object is to provide a vehicle steering mechanism having engaging gears enclosed within a casing and wherein a sleeve-like member, fashioned with the inner and outer surfaces thereof eccentrically disposed with respect to one another, is rotatably interposed between the engaging gears and the casing and which member upon rotation is operative to vary the distance between the respective rotative axes of said engaging gears.

Another object, generally, is to provide a vehicle steering mechanism wherein simplified and positive acting means is operative to vary in infinitely variable increments the distance between the respective rotative axes of operatively engaging driving and driven gears therewithin.

A further object is to provide, in a steering mechanism readily adaptable for manual or power operation, a unique and simplified means for adjusting one of the two gears in an engaging gear unit operative therewithin in order to compensate for wear or an improper meshing fit of the gears in such operatively engaging relationship.

A still further object is to provide a novel, inexpensively fabricated and easily operated mechanism to facilitate the adjustment of the spacing between the rotative axes of gears in meshing engagement in order to compensate for wear or an improper mesh fit of said gears.

The foregoing and other objects and advantages are attained by the present invention, various novel features of which will be apparent from the description herein and the accompanying drawings disclosing one preferred embodiment of the invention, and will be more particularly pointed out in the appended claims.

Fig. 2 is a horizontal sectional view, in enlarged detail, taken on line 2—2 of Fig. 1, showing the structural details of the proposed steering mechanism drive unit.

Fig. 3 is an end elevational view of the proposed steering mechanism unit.

Fig. 4 is a longitudinal and vertical sectional view, in enlarged detail, of the eccentric adjustment sleeve that forms an important part of the present invention.

Fig. 5 is an end elevational view of the eccentrically surfaced adjusting sleeve shown in Fig. 4.

Fig. 6 is a partial vertical sectional view, in enlarged detail, taken on line 6—6 of Fig. 2, showing the details of the mounting and support components of the present invention.

Fig. 7 is a partial vertical sectional view, in enlarged detail, taken generally along the line 7—7 of Fig. 2.

Figure 1:
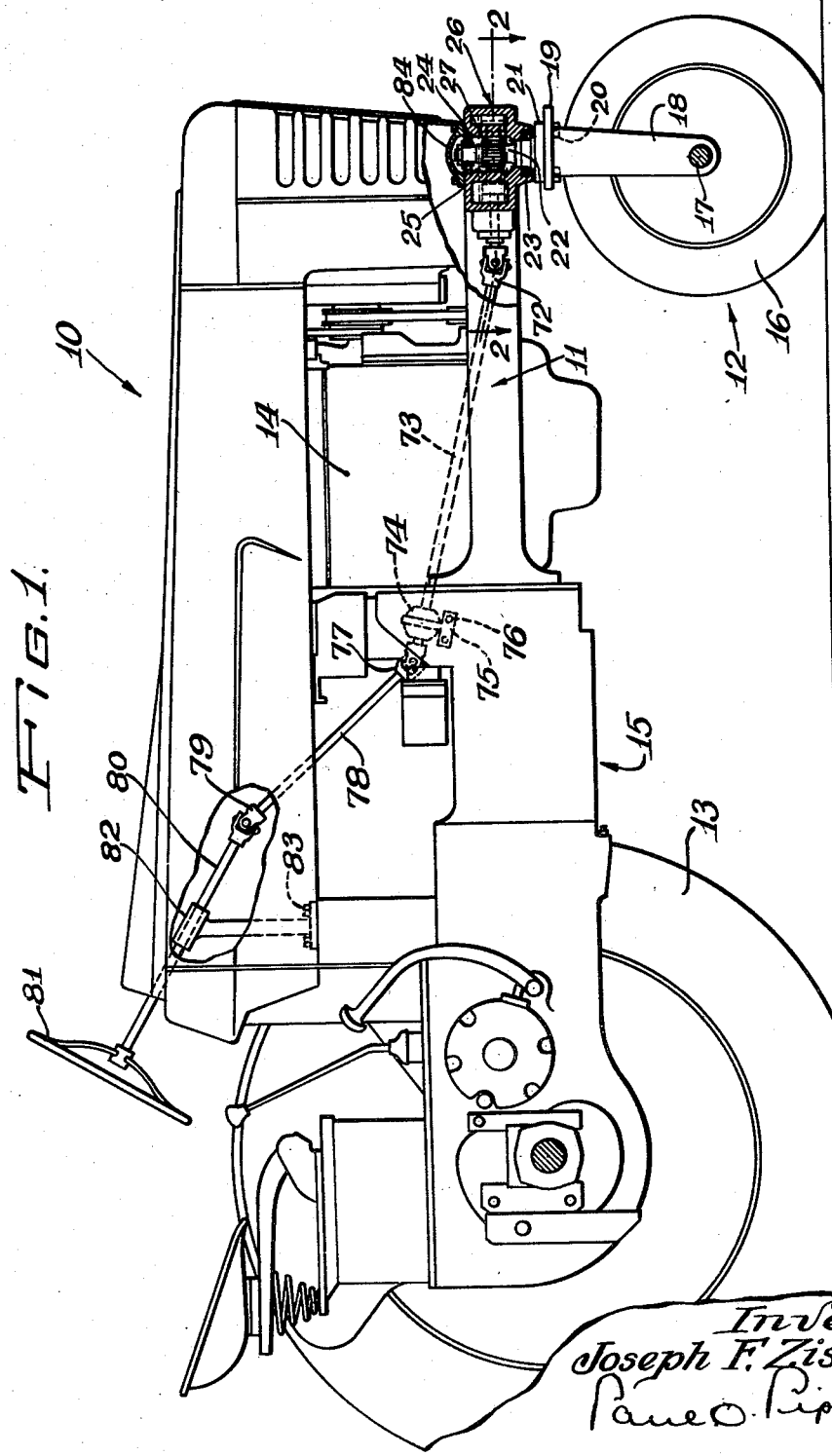
Fig. 1 is a side elevational view, with the wheels nearest the viewer removed, of a tractor in which the present invention has been incorporated, and shown with portions thereof broken away to better illustrate certain details.

Referring now to the drawings, it will be noted that the tractor vehicle which has been selected for illustrating one preferred form or embodiment of the present invention, and designated generally by the reference character 10, is of conventional design, and includes a longitudinally extending frame or chassis 11, a steerable front wheel assembly 12, and a pair of spaced rear traction wheels 13 (only one of which is shown) driven by means of a driving engine 14 connectable thereto through a conventional change-speed transmission and associated differential or final drive unit, indicated in its entirety by the numeral 15. Other components and details, illustrated only to show their general relationship to the vehicle, have not been designated with reference numerals inasmuch as such details are not essential to the inventive concepts hereof and to do so might tend to make the drawings unnecessarily complex.

The steerable front wheel assembly illustrated herein is of the well known dirigible or tricycle type that utilizes a pair of slightly spaced inwardly inclined or cambered wheels (only one of which is shown) mounted on a suitable unitary operated support means, although the use of a single steerable front wheel is also envisaged as being well within the scope of the teachings and concepts of the present invention.

Each of the steerable wheels 16 may be suitably mounted, by conventional bearing and lock-nut retainer means (not shown), on oppositely extending horizontal spindles or stud shafts, such as shown at 17, carried by a vertically and downwardly depending bracket or post-like member 18. A flange 19 at the upper end of said steering post is fastened by suitable bolt or capscrew means, such as 20, to a similarly shaped flange 21 affixed to one end of a vertically extending rod or gear shaft 22 which is journalled, by the spaced bearings 23 and 24, carried in a stepped opening 25 in a bolster portion 26 of the vehicle chassis 11, and a pinion gear 27 affixed for rotation with said gear shaft is disposed intermediate said spaced bearings. Because of space limitations it is preferred that the pinion gear 27 be fashioned as an integral part of shaft 22, but it is understood that it could be separately fashioned and suitably affixed thereto without deviating from any teachings hereof.

The bolster member 26, preferably, is fashioned as a unitary structure that extends between the forward side rails or channel portions 28 of the vehicle chassis or frame 11, and is suitably secured thereto such as by the bolt means 29, and functions as a transverse structural member for the forward portion of the frame as well as providing a housing or casing portion 30 for the steering drive-transmitting mechanism. Extending inwardly from the rearward edge of the housing portion 30 of said bolster is a cylindrical recess 31 that delimits a chamber adapted to receive in housing or casing relationship certain components of the proposed steering mechanism as will presently be described. Mounted for limited rotation within said cylindrical recess is an elongated sleeve member 32 having a piston-like plunger 33, with a gear rack 34 formed along one side thereof, that is positioned within said sleeve and which, in turn, is disposed for slidable movement longitudinally within the sleeve. This piston and rack assembly may be termed a driving member. The gear rack 34 meshes with the pinion gear 27, which may be termed a driven member, mounted on gear shaft 22, which extends through openings 25 and 35 in the bolster housing portion 30 and side wall of sleeve 32, respectively, and thus, in effect, operatively or drivingly connects said gear rack member to the steerable wheel assembly. The piston or plunger 33 is fashioned with a centrally disposed and longitudinally extending axially stepped recess 36 that is adapted to accommodate one end of a threaded shaft such as 37. An enlarged portion 38, of said recess, receives a traveling nut member 39 having a threaded opening therethrough with threads 40 formed therein for matingly receiving the convolutions of a worm gear or the threads 41 provided on shaft 37. The traveling nut 39 has a recessed shoulder portion 42 at one end thereof that seatingly accommodates a retainer or end plate member 43, affixed, by suitable securing means such as the capscrews 44, to the end surface of piston 33 and which, as thus disposed, functions to retain said traveling nut against axial displacement relative to said piston. A threaded locking pin or stud 45 positioned in a threaded opening 46 in the wall of piston 33 has a reduced-section end portion 47 thereon that projects or extends into an interlocking opening 48 in the outer surface of nut member 39, and said pin when thus interlocked serves to prevent independent rotation of said nut with respect to said piston.

The opposite or outwardly extending end of the threaded shaft 37 is journalled in a bearing 49, mounted in a cap or cover member 50, with suitable liquid seals 51 and 52 positioned on either side of said bearing for sealing said shaft against the seepage of liquid therealong. The cap 50 is closely positioned against a collar or ring-like member 53 which, in turn, is positioned against the outer surface of a flange 54, on sleeve 32, while capscrews, such as shown at 55 (Fig. 3), serve to securely affix said cap, collar and sleeve flange members together and to the housing 30. A conventional liquid seal 56, in a recess 57 in the housing 30 facing one side of flange 54, and another seal 58, in a recess 59 on the opposite side of said flange, provide suitable liquid sealing means around the edges of the flanges as will be well understood. It will be appreciated that, if desired, the cam member 50 and collar 53 could be fashioned as a unitary member without deviating from any of the teachings of the present invention.

A collar or annular rim 60 carried by the shaft 37 provides an abutment for one side of a thrust bearing assembly or reactor means, indicated generally by the reference numeral 61, positioned around said shaft and secured against relative axial movement therealong by means of a lock-nut 62 threadably mounted on said shaft. Said thrust bearing or reactor assembly includes a thrust plate or reactor member 63 centrally disposed between a pair of axially spaced back-up plate members 64 and 64a with suitable radial needle bearings 65 and 65a operatively positioned between the respective facing surfaces of said three plate members. A combination washer and lock-nut retainer 66 is positioned between the end or backup plate 64a and the lock-nut 62 for purposes which are well understood. The central plate reactor member 63, being of larger diameter than the adjacent plates 64 and 64a, has a peripheral edge portion that extends outwardly beyond the edges of said adjacent back-up plates and into an annular groove 67 delimited by recess 68 in ring 53 and the adjoining facing surface of hood or cam member 50. An additional recess 69 may be provided in the vicinity of recess 68, in ring member 53, for receiving a conventional liquid seal 70. It will be readily understood now that the thrust bearing assembly 61 provides means for receiving and counteracting any axial thrust of the shaft 37 so as to prevent axial displacement of said shaft as a result of forces transmitted thereto by operation of the engaging rack and pinion gears 34 and 27.

On the outer end of worm shaft 37 there is slidably mounted for rotation therewith, by suitable splining such as indicated at 71, a universal joint coupling 72 the opposite end of which is fastened to a first intermediate shaft 73 and said latter shaft is journalled by means of a spherical bearing 74 mounted in bracket 75, in turn, affixed to the tractor frame 11, by suitable securing means such as the capscrews 76. A second universal joint 77 connects the first intermediate shaft 73 to a second intermediate shaft 78 which is connected by a universal joint 79 to a steering column shaft 80 the opposite end of which may have an operator's steering wheel 81 suitably secured thereto. A bearing bracket 82, affixed to the chassis 11 by suitable securing means such as the capscrews 83, suitably journals the shaft 80 and thus provides means for rotatably supporting the latter shaft on said chassis.

The upper end of opening 25 (Fig. 6), terminating in the upper part of housing 30 proximate the end of the gear shaft 22, provides a means which may be used for lubricating and like purposes, while a cover member 84 positionable over said opening may be suitably detachably secured thereto by fastening means such as the capscrews 85. A threaded access plug 86 may be provided in said cap to permit the introduction of lubricating fluid without having to remove the cap.

The sleeve 32, which forms an important part of the present invention, is generally elongated and the exterior dimensions thereof substantially conform with the interior dimensions of the cylindrical recess 31, in housing 30, so that said sleeve may be rotatably positioned therewithin. The cylindrical exterior surface 87 of said sleeve is eccentrically disposed with respect to the cylindrical interior surface 88 thereof and hence the respective longitudinal axes of these surfaces are parallelly displaced or offset with respect to one another (Figs. 4 and 5). The flange 54, on one end of said sleeve, is provided with a plurality of peripherally extending and spaced notch-like recesses 89 dimensioned so as to accommodate the shanks of the respective capscrew fastening means 55 (Fig. 3) utilized for detachably affixing sleeve flange 54, collar 53 and end cover 50 to the housing 30. A pair of diametrically spaced ears or lugs 90, 90a, extending radially outwardly from the periphery of said flange, provide means for manually rotating the sleeve 32 within the cylindrical recess 31 in order to effect the adjustment desired as will presently be more fully explained. The opening 35 in the wall of said sleeve is dimensioned so as to permit limited rotation of the sleeve and still accommodate gear shaft 22 and associated pinion gear 27 as they pass therethrough and into engagement with the gear rack 34.

When the operator turns the wheel 81 to the right or left, according to the direction in which it is desired to steer the vehicle, the rotative motion thereof is transmitted by way of the connecting and converting yieldable means embracing interconnected steering column shaft 80, intermediate shafts 78 and 73 and threaded shaft 37, to the piston or driving member 33, whereupon the worm threads 41 and the cooperating threads 40 in nut 39 react against one another, but, since the thrust or reactor bearing assembly 61 prevents said threaded shaft from moving axially, and reaction set up between said worm and threaded nut, as a result of the rotation of said threaded shaft, will cause the nut to move axially carrying with it the interlocked piston or plunger 33, thus converting the rotary motion of the wheel 81 to a reciprocatory motion in the piston gear rack 34. As the piston moves axially the gear rack 34 thereon being in mesh with the pinion gear member 27 will cause the rotation of this driven pinion and such motion, in turn, will rotate the gear shaft 22 and the attached steering post 18 to steer or turn the vehicle in the direction desired, thereby converting the reciprocatory motion of the driving piston gear rack to rotary motion in the steerable wheel assembly.

Now, in order to improve the meshing relationship so as to compensate for wear or correct for improper meshing fit of the engaging surfaces of rack 34 and pinion 27 the present invention contemplates providing means for moving or shifting the respective longitudinal axis of one of these gears toward or away, as necessity dictates, from the other, and such displacement is accomplished with the aid of the eccentrically surfaced adjustable mounting sleeve 32. In the instant illustration, since the axis of the pinion gear is relatively fixed, the axis of the gear rack is the one that is adapted for movement. When it is desired to effect the necessary adjustment or displacement of the latter axis the fastening capscrews or bolts 55 are loosened, whereupon the sleeve flange 54 may be manually rotated using the lugs 90, 90a to assist in this operation. As the sleeve 32 is rotated the eccentrically disposed cylindrical surfaces thereof react between the interior surface of the cylindrical recess 31 and the piston 33 to cause a parallel displacement or shifting of the longitudinal axis of the sleeve's cylindrical interior surface 88 which movement carries the associated piston 33 and attached gear rack 34 to a new parallely displaced axis. By thus shifting the rotative axis of the gear rack it is possible to bring the meshing surfaces of said rack and pinion into better and more complete meshing relationship, thereby correcting or compensating for wear or for any misalignment error, because of manufacturing or other dimensional inaccuracies, thereof.

As the longitudinal axis of the threaded shaft 37 is thus displaced parallel unto itself the slidably attached universal joint coupling 72 is also transversely displaced by the same amount as the shaft's axis and this limited movement produces a concomitant small axial movement of said coupling. However, since coupling 72 is splined to shaft 37 it will be appreciated that this small axial movement may easily be accommodated without hindering the rotative movement of the adjustable sleeve 32. As one aid to facilitate the accommodation of the axial and radial displacement of coupling 72, however, the opposite end of shaft 73 is journalled in the spherical bearing 74 thereby permitting connecting shaft 73 a reasonable leeway in the axial and transverse movement of the end attached to coupling 72. In the event additional leeway for axial movement of the shaft 73 is desired such may be obtained by way of the universal couplings 77 and 79 which connect the second intermediate shaft 78, respectively, to the shafts 73 and 80 thereby permitting a reasonable amount of movement for shaft 73.

As thus arranged the means that drivingly or operatively connects the operator's wheel 81 with piston driving member 33 will be seen to be a yieldable or flexible connecting means and it will be appreciated that other well-known or conventional connecting means may be used for such purpose while the one selected for illustration herein is only one preferred adaptation and hence the invention should not be limited thereto. A Bowden or flexible wire type of control cable, which is well known in the art, could conceivably be used in lieu of the linkage illustrated without deviating from the teachings hereof. Since the amount of transverse movement or axis displacement effected by the adjusting sleeve 32 is quite small relatively speaking it would be possible to use the present device without a yieldable connection between the piston and the operator's wheel, but the preferred application, which provides a smoother and more easily manipulated device, envisages the use of a yieldable operative connection therebetween.

Although the present invention has been illustrated as applied to a manually operated vehicle steering mechanism, it is equally applicable to a power assist mechanism without deviating from the teachings hereof. For instance, by replacing the thrust bearing assembly 61 with a well known type of valve actuating device, such as is shown in my copending U.S. patent application, Serial No. 673,086, filed July 19, 1957, and then installing rings on the piston 33 and suitable oil seals in the cylindrical recess 31, the mechanism would be ready for connection into a hydraulic system, for use as a power-operated mechanism, and the operation of the adjustable eccentric mounting sleeve, to improve the meshing relationship so as to compensate for wear or other inaccuracies of the rack and pinion gears, would be identical with that previously described.

It should now be apparent that a novel means for adjusting gears in a steering mechanism to improve their meshing relationship so as to compensate for wear or correct for dimensional inaccuracies therein has been shown and described, and it is to be understood that changes may be made in the construction without departing from the spirit of the invention or the scope thereof as defined in the appended claims.

What is claimed is:

1. In a vehicle steering mechanism adapted for connection at one end to an operator's control wheel and at the other end thereof to a vehicle steerable wheel assembly, the combination, comprising: a reciprocable driving member; motion transmitting means connectable between said reciprocable driving member and the operator's control wheel and operable for converting rotary motion of the operator's wheel to reciprocatory movement of the driving member; a shaft connectable at one end to the steerable wheel assembly and having a driven member mounted thereon and constrained for rotation therewith; said driven member being disposed in driving relation with said reciprocable driving member and operable for converting reciprocatory motion of the driving member to rotary motion for steering the steerable wheel assembly; and eccentric means engageable with said reciprocable driving member and adjustable for varying the distance between the axis along which said driving member reciprocates and the axis about which said driven member rotates so as to improve the driving relationship between said driving and driven members.

2. In a vehicle steering mechanism adapted for connection at one end to an operator's control wheel and at the other end thereof to a vehicle steerable wheel assembly, the combination, comprising: a housing having a recess extending inwardly from an end thereof; a gear rack member slidably positioned within said recess; means connecting said gear rack member with the operator's control wheel and operable for sliding said gear rack within said recess in response to turning of the operator's control wheel; means connectable at one end to the steerable wheel assembly and including a shaft with a pinion gear mounted on the end thereof and constrained for rotation therewith and disposed in meshing engagement with said gear rack member, and operable for converting the sliding motion of said gear rack member into rotary motion for turning the steerable wheel assembly; rotatable means including a hollow member rotatable on an axis parallel to the axis along which said gear rack member slides and interposed between said gear rack member and said housing and reactive therebetween upon rotation for displacing the axis along which said gear rack slides and selectively moving it toward or away from the axis upon which said pinion gear rotates so as to obtain improved meshing engagement between said gears.

3. In a vehicle steering mechanism adapted for interconnection between an operator's control wheel and a steerable wheel assembly, the combination, comprising: a housing supported by the vehicle and having a cylindrical recess extending inwardly from an end thereof; a driving member slidably positioned within said recess; means operatively connecting said driving member with the operator's control wheel and operable for slidably moving said driving member within said recess in response to a turning of the operator's control wheel; means drivingly connectable between the vehicle steerable wheel assembly and said driving member, including a shaft having a driven member mounted thereon and constrained for rotation therewith and disposed in driving relation with said driving member, and operable for converting the sliding motion of said driving member into a rotary motion that turns the steerable wheel assembly; a rotatable sleeve interposed between said driving member and said housing; said sleeve being fashioned with the outer surface thereof eccentrically disposed with respect to the inner surface so that upon rotation of the sleeve said surfaces are reactive between said housing and said driving member for varying the distance between the axis along which said driving member slides and the axis about which said driven member rotates in order to improve the driving relationship therebetween.

4. In a vehicle steering mechanism adapted for interconnection between an operator's control wheel and a steerable wheel assembly, the combination, comprising: a housing supported by the vehicle and having a cylindrical recess extending inwardly from an end thereof; a gear rack member slidably positioned within said recess; means operatively connecting said gear rack member with the operator's control wheel and operable for slidably moving said gear rack within said recess in response to a turning of the operator's control wheel; means operatively connectable between the vehicle steerable wheel assembly and said gear rack member, including a shaft having a pinion gear mounted thereon and constrained for rotation therewith and disposed in meshing relation with said gear rack, and operable for converting the sliding motion of said gear rack member into a rotary motion that turns the steerable wheel assembly; a longitudinally extending sleeve interposed between said gear rack member and said housing and disposed for limited rotation in both directions about a longitudinal axis; said sleeve having the outer surface thereof circumscribed about a longitudinal axis which coincides with the longitudinal axis of said cylindrical recess while the inner surface of said sleeve is circumscribed about a longitudinal axis parallelly displaced from the axis of said outer surface so that upon rotation of the sleeve the axis of said inner surface is displaced and selectively moved toward or away from the axis of rotation of said pinion gear in order to obtain improved meshing engagement between said gears.

5. In a vehicle steering mechanism adapted for interconnection between an operator's control wheel and a steerable wheel assembly, the combination, comprising: a housing supported by the vehicle and having a cylindrical recess extending inwardly from an end thereof; a gear rack member slidably positioned within said recess; means operatively connecting said gear rack member with the operator's control wheel and operable for slidably moving said gear rack within said recess in response to a turning of the operator's control wheel; means operatively connectable between the vehicle steerable wheel assembly and said gear rack member, including a shaft having a pinion gear mounted thereon and constrained for rotation therewith and disposed in meshing relation with said gear rack, and operable for converting the sliding motion of said gear rack member into a rotary motion that turns the steerable wheel assembly; a longitudinally extending sleeve interposed between said gear rack member and said housing and disposed for limited rotative movement about the longitudinal axis thereof; flange means on one end of said sleeve engageable in abutting relation with said housing; fastening means cooperative between said housing and said flange for fixedly positioning said sleeve against axial and rotative displacement with respect to said housing; said sleeve being fashioned on the longitudinal axis thereof with the outer surface eccentrically disposed with respect to the inner surface so that upon rotation of said sleeve said surfaces are reactive between said housing and said gear rack member for varying the distance between the longitudinal axis of said gear rack member and the rotative axis of said pinion gear in order to obtain optimum meshing engagement of said gears.

6. In a vehicle steering mechanism adapted for interconnection between an operator's control wheel and a steerable wheel assembly, the combination, comprising: a housing adapted for affixment to the vehicle and having a cylindrical recess extending inwardly from an end thereof; a longitudinally extending sleeve disposed for limited rotative movement within said recess; a piston slidably positioned within said recess; means operatively connecting said piston with the operator's control wheel and operative for slidably moving said piston within said recess in response to a turning of the operator's control wheel; said piston having a longitudinally extending gear rack provided thereon; means including a shaft having a pinion thereon and constrained for rotation therewith and disposed in meshing relation with said gear rack operatively connected between the steerable wheel assembly and said gear rack and operative for converting the sliding motion of said gear rack into a rotary motion that turns the steerable wheel assembly; said sleeve having an opening therein to accommodate passage of said shaft and pinion; a radially extending flange on one end of said sleeve engageable in abutting relation with said housing; said flange having a plurality of circumferentially extending and peripherally spaced notch-like recesses therein; detachable fastening means carried by said housing and cooperative with the recesses in said flange for positioning said sleeve against axial and rotative movement with respect to said housing; said sleeve being fashioned with the outer surface eccentrically disposed on the longitudinal axis thereof with respect to the inner surface of the sleeve so that upon rotation of the sleeve said sleeve reacts between said housing and said piston to cause a parallel displacement of the longitudinal axis of said piston and thereby effecting a variation in the distance between the longitudinal axis of said gear rack and the rotative axis of said pinion gear.

7. In a vehicle steering mechanism adapted for interconnecting between an operator's control wheel and a steerable wheel assembly, the combination, comprising: a housing adapted for affixment to the vehicle and having a cylindrical recess extending inwardly from an end thereof; a longitudinally extending sleeve disposed for limited rotative movement within said recess; a piston slidably positioned within said recess; yieldable means operatively connecting said piston with the operator's control wheel and operative for slidably moving said piston within said recess in response to a turning of the operator's control wheel and yieldable to permit limited radial and axial displacement of portions thereof in the vicinity of the piston; said piston having a longitudinally extending gear rack provided thereon; means including a shaft having a pinion thereon and constrained for rotation therewith and disposed in meshing relation with said gear rack operatively connected between the steerable wheel assembly and said gear rack and operative for converting the sliding motion of said gear rack into a rotary motion that turns the steerable wheel assembly; said sleeve having an opening in the wall thereof dimensioned to accommodate said pinion gear and shaft during all of the related movements of the sleeve; a radially extending flange on one end of said sleeve engageable in abutting relation with said housing; said flange having a plurality of lugs extending radially therefrom to facilitate manual rotation thereof; detachable means carried by said housing and cooperative with said flange for fastening said sleeve against movement relative to said housing; said sleeve being fashioned with the outer surface eccentrically disposed with respect to the inner surface thereof so that upon rotation of the sleeve said sleeve reacts between said housing and said piston to cause a parallel displacement of the longitudinal axis of said piston, thereby effecting a variation in the distance between the longitudinal axis of said gear rack and the rotative axis of said pinion gear.

8. In a vehicle steering mechanism adapted for interconnection between an operator's control wheel and a steerable wheel assembly, the combination, comprising: a housing adapted for affixment to the vehicle and having a cylindrical recess extending inwardly from an end thereof; a longitudinally extending sleeve disposed for limited rotative movement within said recess; a piston slidably positioned within said recess; yieldable connecting means operatively connecting said piston with the operator's control wheel and operative for slidably moving said piston within said recess in response to rotation of the operator's control wheel; said connecting means including a plurality of spaced flexible couplings one of which is mounted for slidable axial movement, and being disposed to permit small increments of transverse and axial displacement of the portion of said means near said piston; said piston having a longitudinally extending gear rack fashioned thereon; means operatively connectable between the vehicle steerable wheel assembly and said gear rack, including a shaft having a pinion gear constrained for rotation therewith and having said shaft disposed in a plane normal to the longitudinal axis of said gear rack and with said pinion gear disposed in meshing engagement with said gear rack, and operative for converting the sliding motion imparted to said gear rack into a rotary motion that turns the steerable wheel assembly, said sleeve having an opening therein dimensioned to accommodate said pinion gear and shaft; a radially extending flange on one end of said sleeve engageable in abutting relation with said housing; said flange having a plurality of peripherally spaced and extending recesses therein; detachable means carried by said housing and cooperative with said recesses for fastening said sleeve against movement with respect to said housing; said sleeve being fashioned with the outer surface centered on a longitudinal axis parallelly displaced from the longitudinal axis about which the inner surface of said sleeve and said piston are centered so that upon rotation of said sleeve about its longitudinal axis said sleeve reacts between said housing and said piston to cause a parallel displacement of the longitudinal axis of said piston and incident thereto a variation in the distance between the longitudinal axis of the gear rack on said piston and the rotative axis of said pinion gear.

9. In a vehicle steering mechanism adapted for interconnection between an operator's control wheel and a steerable wheel assembly, the combination, comprising: a housing adapted for affixment to the vehicle and having a cylindrical recess extending inwardly from an end thereof; a longitudinally extending sleeve disposed for limited rotative movement within said recess; a piston slidably positioned within said recess; connecting means operatively connecting said piston with the operator's control wheel and operative for slidably moving said piston within said recess in response to rotation of the operator's control wheel; said connecting means including a plurality of spaced flexible couplings disposed to permit small increments of transverse displacement of the portion of said means near said piston; said piston having a longitudinally extending gear rack fashioned thereon; means operatively connectable between the vehicle steerable wheel assembly and said gear rack, including a shaft having a pinion gear constrained for rotation therewith and having said shaft disposed in a plane normal to the longitudinal axis of said gear rack and with said pinion gear disposed in meshing engagement with said gear rack, and operative for converting the sliding motion imparted to said gear rack into a rotary motion that turns the steerable wheel assembly; said sleeve having an opening therein dimensioned to accommodate said pinion gear and shaft; a radially extending flange on one end of said sleeve engageable in abutting relation with said housing; said flange having a plurality of peripherally spaced and extending recesses therein; detachable means carried by said housing and cooperative with said recesses for fastening said sleeve against movement with respect to said housing; said sleeve being fashioned with the outer surface centered on a longitudinal axis parallelly displaced from the longitudinal axis about which the inner surface of said sleeve and said piston are centered so that upon rotation of said sleeve about its longitudinal axis said sleeve reacts between said housing and said piston to cause a parallel displacement of the longitudinal axis of said piston and incident thereto a variation in the distance between the longitudinal axis of the gear rack on said piston and the rotative axis of said pinion gear.

References Cited in the file of this patent
UNITED STATES PATENTS

| | | |
|---|---|---|
| 1,193,133 | Flora | Aug. 1, 1916 |
| 2,068,679 | Hokansson | Jan. 26, 1937 |
| 2,784,611 | Davis | Mar. 12, 1957 |

FOREIGN PATENTS

| | | |
|---|---|---|
| 455,844 | Germany | Feb. 10, 1928 |